July 10, 1934.  P. WONDRA  1,965,756
AUTOMOBILE MUD GUARD
Filed June 2, 1932
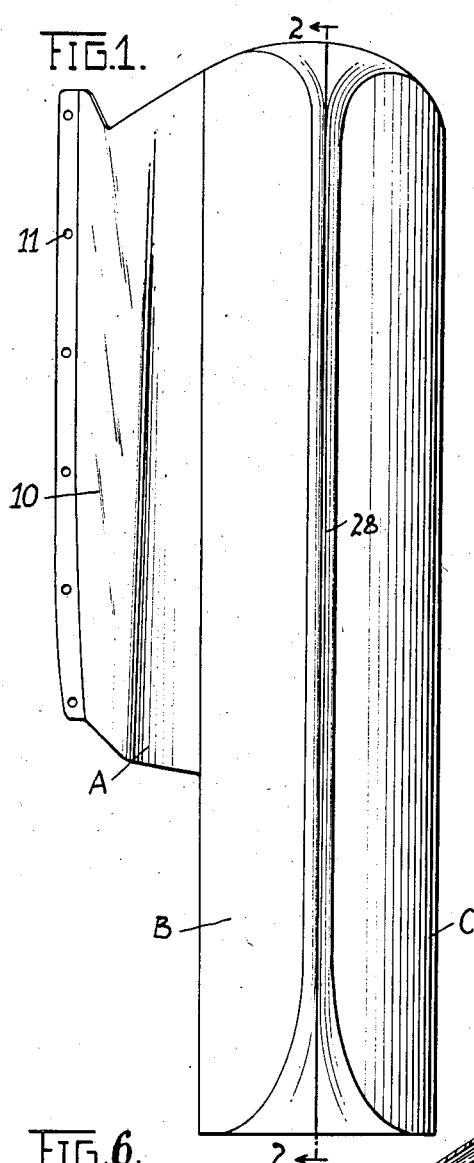
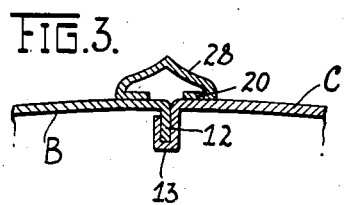
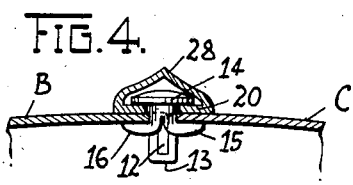
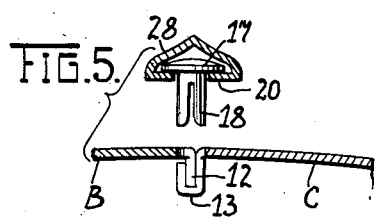
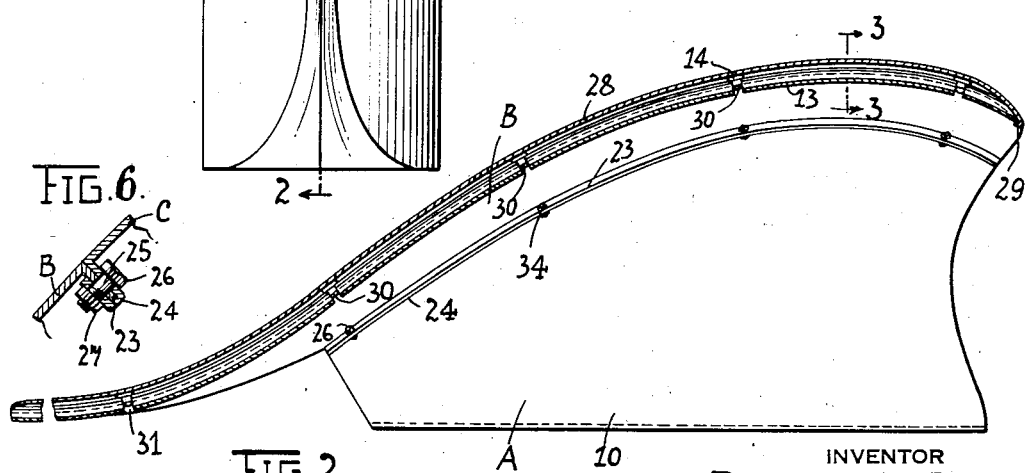
INVENTOR
PAUL WONDRA
BY
ATTORNEY Patented July 10, 1934

1,965,756

UNITED STATES PATENT OFFICE 1,965,756

AUTOMOBILE MUD GUARD

Paul Wondra, Little Ferry, N. J.

Application June 2, 1932, Serial No. 614,929

1 Claim. (Cl. 280—152)

This invention relates to improvements in automobile mud guards, and it is an object of my invention to provide a collapsible or foldable mud guard which consists of several parts and allows the exchange of a worn or damaged part without inconvenience and delay.

Another object of my invention is the provision of an automobile mud guard composed of a plurality of parts which are connected with one another in a simple, and efficient manner.

A still further object of my invention is the provision of an automobile mud-guard which can readily be attached to any of the automobiles at present on the market without material changes.

These and other objects and advantages of my invention will appear as the description thereof proceeds, and will then be specifically defined in the appended claim.

In the accompanying drawing, forming a material part of this disclosure:

Fig. 1 is a plan view of an automobile mud guard constructed according to my invention.

Fig. 2 is a longitudinal sectional view taken on line 2—2 of Fig. 1.

Fig. 3 is a transverse sectional view illustrating the preferred form of the joint at two adjoining parts of the mud guard, the section being taken on line 3—3 of Figure 2.

Fig. 4 is a modified form of the union shown in Figure 3.

Fig. 5 is a sectional view showing the parts used in making the joint seen in Fig. 4.

Figure 6 is a transverse sectional view of a modified form of joint construction.

As illustrated, the mud guard consists of the customary guard 10 attached to the automobile in the usual manner by fastening means, passed through openings 11 in its inner flange.

The guard 10, also designated by the letter A, may be integral with or attached to part B, which is curved in the usual manner to extend over the wheel, as the inner element of the mud guard.

Part C is removably joined to part B and constitutes the outer part of the mud guard which, when damaged, may readily be removed and another substituted.

Parts B and C are united at their meeting ends in various ways, for instance as shown in Figure 3 by engaging a depending flange 12 of part B in a groove formed by bending the inner margin of part C upon itself, as shown at 13.

As shown in Figure 4, the joint may be formed by passing a headed cotter pin 14 having a shank split to form members 15, 16 bent outwardly and upwardly to engage the under surfaces of parts B and C, as shown in Figure 5.

As shown in Figure 6, a screw bolt 19 is passed through the inner flanges 20, 21 of parts B and C, and held in position by a nut 22.

As illustrated in Figure 6, the part B has an outer depending flange 23 engaged in a groove formed by the inner flange 24 of part C bent upon itself, and a bolt 25 passes through both flanges and is held in place by a nut 27.

The seam formed at the meeting margins of parts B and C is covered by a curved channel bar of chrome steel or the like, designated 28 having one end formed into a hook 29 to grip over the outer ends of parts B and C at their point of union, and equipped intermediate its ends with depending fingers 30 passing through recesses 31 in the inner meeting margins of parts B and C, and adapted to be bent against the inner faces thereof to hold the bar in place.

In use, part C is fitted against the outer margin of part B and as it is made to conform to the same, will snugly engage the same and the inner flanges of both parts will be united by means of the bolts 25, whereupon the bar 28 is placed upon the outer face of the seam to cover the same and the fingers 30 are bent to engage the lower faces of parts B and C.

It will be understood that I have described and shown some forms of my invention as examples, and that I may make such changes therein as come within the scope of the appended claim, without departure from my invention.

Having thus described my invention, what I claim as new and desire to secure by Letters Patent, is:

A mud guard for a vehicle having a wheel, comprising a stationary portion secured to the vehicle, a pair of opposed elements of substantially the same length and width, said elements being joined and curved conformably with the wheel and spaced therefrom, one of said elements being secured to said stationary portion, an inverted channel bar having inturned edges, disposed over the joint between the opposed elements, a hook on said channel bar adapted to engage under one of the ends of said opposed elements at the joint therebetween, and a series of depending fingers extending from the inturned edges of said channel bar to engage the juxtaposed edges of said opposed elements, said fingers passing through openings in the adjacent portions of said elements.

PAUL WONDRA.